US012731558B2

(12) United States Patent
Hao et al.

(10) Patent No.: US 12,731,558 B2
(45) Date of Patent: Sep. 8, 2026

(54) AREA-BASED DISPLAY METHOD AND DISPLAY DEVICE

(71) Applicants: Beijing BOE Display Technology Co., Ltd., Beijing (CN); BOE Technology Group Co., Ltd., Beijing (CN); Beijing BOE Technology Development Co., Ltd., Beijing (CN)

(72) Inventors: Kexin Hao, Beijing (CN); Xin Duan, Beijing (CN); Shuhuan Yu, Beijing (CN); Rui Liu, Beijing (CN); Wei Sun, Beijing (CN)

(73) Assignees: ASSIGNEEBeijing BOE Display Technology Co., Ltd., Beijing (CN); BOE Technology Group Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/996,076

(22) PCT Filed: May 19, 2023

(86) PCT No.: PCT/CN2023/095385
§ 371 (c)(1),
(2) Date: Jan. 17, 2025

(87) PCT Pub. No.: WO2024/239167
PCT Pub. Date: Nov. 28, 2024

(65) Prior Publication Data
US 2026/0038457 A1 Feb. 5, 2026

(51) Int. Cl.
*G09G 5/00* (2006.01)

(52) U.S. Cl.
CPC ..... *G09G 5/003* (2013.01); *G09G 2300/0408* (2013.01); *G09G 2310/04* (2013.01); *G09G 2320/0252* (2013.01)

(58) Field of Classification Search
CPC ............................................ G09G 2340/0435
See application file for complete search history.

(56) References Cited

U.S. PATENT DOCUMENTS 9,906,816 B2 2/2018 Toth et al.
12,154,496 B2 * 11/2024 Zong .................. G09G 3/3225
(Continued)

FOREIGN PATENT DOCUMENTS

CN 101197110 A * 6/2008
CN 109766011 A 5/2019
(Continued)

*Primary Examiner* — Shaheda A Abdin
(74) *Attorney, Agent, or Firm* — Workman Nydegger

(57) ABSTRACT

A method for partition display and display device. The method includes: receiving and displaying by the display device, the current frame image, obtaining the fixation point coordinates (100) of the user on the display screen (600) of the display device; according to the fixation point coordinates, dividing the display region of the display screen (600) into a plurality of display areas, and determining first controllers respectively corresponding to the plurality of display areas, and each first controller includes at least one driving chip (SD #1, SD #2, SD #3, SD #4, SD #5, SD #6, SD #7, and SD #8) (101); receiving the next frame image, using the first controllers to respectively control the next frame image for being displayed in the plurality of display areas, wherein the next frame image includes a plurality of sub-images, and one display region is used for displaying one sub-image (102).

17 Claims, 5 Drawing Sheets

(56) References Cited

U.S. PATENT DOCUMENTS

| | | | | |
|---|---|---|---|---|
| 2011/0032231 | A1* | 2/2011 | Maruyama | G09G 3/2096 345/208 |
| 2011/0199326 | A1* | 8/2011 | Takano | G06F 3/0416 345/173 |
| 2016/0270656 | A1* | 9/2016 | Samec | A61B 5/1455 |
| 2018/0366068 | A1* | 12/2018 | Liu | G06V 40/171 |

FOREIGN PATENT DOCUMENTS

| | | | |
|---|---|---|---|
| CN | 110023881 | A | 7/2019 |
| CN | 111683238 | A | 9/2020 |
| CN | 112102172 | A | 12/2020 |
| CN | 113315964 | A | 8/2021 |
| CN | 114860062 | A | 8/2022 |
| CN | 115424584 | A | 12/2022 |
| CN | 115938263 | A | 4/2023 |
| JP | 2002189464 | A | 7/2002 |
| JP | 2011133516 | A | 7/2011 |
| TW | 202305463 | A | 2/2023 |
| TW | 202316179 | A | 4/2023 |
| WO | 2022178811 | A1 | 9/2022 |
| WO | 2023024112 | A1 | 3/2023 |

* cited by examiner

AREA-BASED DISPLAY METHOD AND DISPLAY DEVICE

CROSS-REFERENCE TO RELATED APPLICATIONS

The present disclosure is a National Stage of International Application No. PCT/CN2023/095385, filed on May 19, 2023, the entire content of which is incorporated herein by reference.

TECHNICAL FIELD

The disclosure relates to the technical field of display, in particular to a method for partition display and a display device.

BACKGROUND

Compared with traditional interaction methods, the human-computer interaction system designed based on eye tracking technology shows more direct and efficient advantages, so as to better realize the idea of "What You See Is What You Get (WYSIWYG)" human-computer interaction. On this basis, the use of eye tracking technology with the help of display devices, and the use of fixation point instead of manual operations, can more conveniently complete human-computer interaction.

In the current display scheme combined with eye tracking technology, after obtaining the human eye image and extracting the coordinates of the fixation point of the human eyes, the GPU (Graphics Processing Unit) converts the coordinates of the fixation point of the human eyes, and the GPU needs to divide the to-be-displayed image data into multiple pieces of grid data in advance, and the grid data is arranged according to the rules and sent to the display device for output.

Affected by the system architecture of the current display scheme, when the human eyes move rapidly, it is difficult for the display device to respond in time, which makes the displayed image data produce a sense of lag and affect the viewing effect.

SUMMARY

The present disclosure provides a method for partition display and display device, which are used to solve the problem that when the human eyes move rapidly, the display device is difficult to respond in time, and the display image produces a sense of hysteresis.

In the first aspect, some embodiments of the present disclosure provide a method for partition display, including: receiving and displaying, by a display device, a current frame image, and obtaining fixation point coordinates of a user on a display screen of the display device; dividing a display region of the display screen into a plurality of display areas according to the fixation point coordinates, and determining first controllers respectively corresponding to the plurality of display areas, wherein each of the first controllers includes at least one driving chip; and receiving a next frame image, and controlling the next frame image for being displayed in the plurality of display areas by using the first controllers, respectively, wherein the next frame image includes a plurality of sub-images, and one display region is used for displaying one sub-image.

As an optional implementation, the plurality of display areas include a fixation area and a non-fixation area; and the dividing the display region of the display screen into the plurality of display areas according to the fixation point coordinates, includes: dividing the display region into the fixation area and the non-fixation area according to the fixation point coordinates and a viewing angle range of the user, wherein sub-images displayed in the fixation area are within the viewing angle range, and sub-images displayed in the non-fixation area exceed the viewing angle range.

As an optional implementation, the fixation area includes a boundary area, and the boundary area is determined according to a display cell controlled by the driving chip corresponding to a boundary of the fixation area, wherein the display region includes a plurality of display cells, and each of the plurality of display cells is controlled for display through one driving chip.

As an optional implementation, the controlling the next frame image for being displayed in the plurality of display areas by using the first controllers, includes: controlling, according to a difference degree between sub-images in the next frame image and in the current frame image, the next frame image for being displayed in the plurality of display areas by using the first controllers.

As an optional implementation, the controlling, according to a difference degree between each of sub-images in the next frame image and each of sub-images in the current frame image, the next frame image for being displayed in the plurality of display areas by using the first controllers, includes: in a condition that difference degrees between a part of sub-images in the next frame image and in the current frame image are greater than an image threshold, refreshing and displaying the part of sub-images in the next frame image; or in a condition that difference degrees between all sub-images in the next frame image and in the current frame image are greater than the image threshold, refreshing and displaying all the sub-images in the next frame image.

As an optional implementation, the plurality of display areas include a fixation area and a non-fixation area; in a condition that difference degrees between sub-images in the fixation area in the next frame image and in the current frame image are greater than the image threshold, and difference degrees between sub-images in the non-fixation area in the next frame image and in the current frame image are less than or equal to the image threshold, refreshing and displaying the sub-images in the fixation area in the next frame image by using the first controller corresponding to the fixation area.

As an optional implementation, the method further includes: in a condition that the difference degrees between a part of sub-images in the next frame image and in the current frame image are greater than the image threshold: determining a first display area corresponding to the part of sub-images, and turning on an operational amplifier (OP) of the driving chip in the first controller corresponding to the first display area; and determining a second display area corresponding to sub-images other than the part of the sub-images, and turning off the OP of the driving chip in the first controller corresponding to the second display area.

As an optional implementation, the method further includes: determining second controllers respectively corresponding to the plurality of display areas, wherein each of the second controllers includes at least one group of gate driver on array (GOA) circuits, and each group of GOA circuits is controlled through a separate signal; and scanning the plurality of display areas by using the second controllers to refresh and display sub-images corresponding to the plurality of display areas.

As an optional implementation, the plurality of display areas include a fixation area and a non-fixation area; and the scanning the plurality of display areas by using the second controllers includes: in a condition that difference degrees between sub-images in the fixation area in the next frame image and in the current frame image are greater than an image threshold, and difference degrees between sub-images in the non-fixation area in the next frame image and in the current frame image are less than or equal to the image threshold, scanning the fixation area sequentially in rows by using the second controller corresponding to the fixation area; or in a condition that difference degrees between all sub-images in the next frame image and in the current frame image are greater than an image threshold, scanning the fixation area sequentially in rows by using the second controller corresponding to the fixation area, and simultaneously scanning the non-fixation area in multiple rows by using the second controller corresponding to the non-fixation area.

As an optional implementation, the method further includes: in a condition that difference degrees between sub-images in the fixation area in the next frame image and in the current frame image are greater than the image threshold, and difference degrees between sub-images in the non-fixation area in the next frame image and in the current frame image are less than or equal to the image threshold: loading a control signal to each group of GOA circuits in the second controller corresponding to the fixation area, and unloading a control signal to each group of GOA circuits in the second controller corresponding to the non-fixation area.

As an optional implementation, the method further includes: in response to a specified operation for an any region in the display region, determining a first sub-image, corresponding to the any region, in the next frame image; controlling the first sub-image in the next frame image to be refreshed and displayed by using a first controller corresponding to the any region.

As an optional implementation, the method further includes: sending the fixation point coordinates to a graphics processing unit (GPU) for the GPU to determine the plurality of display areas according to the fixation point coordinates and to compress sub-images corresponding to different display areas in the next frame image according to different compression ratios; and/or, sending location information of the plurality of display areas and identification information corresponding to the plurality of display areas to the GPU for the GPU to compress sub-images corresponding to different display areas in the next frame image according to different compression ratios, wherein the identification information is used for representing the driving chip.

As an optional implementation, the plurality of display areas include a fixation area and a non-fixation area; sub-images corresponding to the fixation area in the next frame image are uncompressed images, and sub-images corresponding to the non-fixation area in the next frame image are compressed images; or a compression ratio of the sub-images corresponding to the fixation area in the next frame image is lower than a compression ratio of the sub-images corresponding to the non-fixation area in the next frame image.

As an optional implementation, the fixation area includes a boundary area; and sub-images corresponding to the boundary area in the next frame image are images including compressed image data and uncompressed image data.

As an optional implementation, the display screen is configured to display 3D images of different viewing angles, and image contents of the 3D images of different viewing angles are different.

As an optional implementation, the method further includes: transmitting the fixation point coordinates to the first controllers, so that the first controller determines the plurality of display areas according to the fixation point coordinates and uses driving chips corresponding to the plurality of display areas for refreshing and displaying; and/or, transmitting location information of the plurality of display areas and identification information corresponding to the plurality of display areas to the first controllers, so that the first controller uses driving chips corresponding to the plurality of display areas for refreshing and displaying.

As an optional implementation, the obtaining the fixation point coordinates of the user on the display screen of the display device, includes: obtaining the fixation point coordinates of the user on the display screen of the display device by a camera device, wherein the camera device is integrated on the display device.

In the second aspect, some embodiments of the present disclosure a display device, including a display screen and a processor, wherein: the display screen is configured to display contents; and the processor is configured to: receive and display a current frame image, and obtain fixation point coordinates of a user on a display screen of the display device; divide a display region of the display screen into a plurality of display areas according to the fixation point coordinates, and determine first controllers respectively corresponding to the plurality of display areas, wherein each of the first controllers includes at least one driving chip; and receive a next frame image, and control the next frame image for being displayed in the plurality of display areas by using the first controllers, respectively, wherein the next frame image includes a plurality of sub-images, and one display region is used for displaying one sub-image.

As an optional implementation, the plurality of display areas include a fixation area and a non-fixation area; and the processor is further configured to divide the display region into the fixation area and the non-fixation area according to the fixation point coordinates and a viewing angle range of the user, wherein sub-images displayed in the fixation area are within the viewing angle range, and sub-images displayed in the non-fixation area exceed the viewing angle range.

As an optional implementation, the fixation area includes a boundary area, and the boundary area is determined according to a display cell controlled by the driving chip corresponding to a boundary of the fixation area, wherein the display region includes a plurality of display cells, and each of the plurality of display cells is controlled for display through one driving chip.

As an optional implementation, the processor is further configured to: control, according to a difference degree between sub-images in the next frame image and in the current frame image, the next frame image for being displayed in the plurality of display areas by using the first controllers.

As an optional implementation, the processor is further configured to: in a condition that difference degrees between a part of sub-images in the next frame image and in the current frame image are greater than an image threshold, refresh and display the part of sub-images in the next frame image; or in a condition that difference degrees between all sub-images in the next frame image and in the current frame image are greater than the image threshold, refresh and display all the sub-images in the next frame image.

As an optional implementation, the plurality of display areas include a fixation area and a non-fixation area; and the processor is further configured to: in a condition that difference degrees between sub-images in the fixation area in the next frame image and in the current frame image are greater than the image threshold, and difference degrees between sub-images in the non-fixation area in the next frame image and in the current frame image are less than or equal to the image threshold, refresh and display the sub-images in the fixation area in the next frame image by using the first controller corresponding to the fixation area.

As an optional implementation, in a condition that the difference degrees between a part of sub-images in the next frame image and in the current frame image are greater than the image threshold, the processor is further configured to: determine a first display area corresponding to the part of sub-images, and turn on an operational amplifier (OP) of the driving chip in the first controller corresponding to the first display area; and determine a second display area corresponding to sub-images other than the part of the sub-images, and turn off the OP of the driving chip in the first controller corresponding to the second display area.

As an optional implementation, the processor is further configured to: determine second controllers respectively corresponding to the plurality of display areas, wherein each of the second controllers includes at least one group of gate driver on array (GOA) circuits, and each group of GOA circuits is controlled through a separate signal; and scan the plurality of display areas by using the second controllers to refresh and display sub-images corresponding to the plurality of display areas.

As an optional implementation, the plurality of display areas include a fixation area and a non-fixation area; and the processor is further configured to: in a condition that difference degrees between sub-images in the fixation area in the next frame image and in the current frame image are greater than an image threshold, and difference degrees between sub-images in the non-fixation area in the next frame image and in the current frame image are less than or equal to the image threshold, scan the fixation area sequentially in rows by using the second controller corresponding to the fixation area; or in a condition that difference degrees between all sub-images in the next frame image and in the current frame image are greater than an image threshold, scan the fixation area sequentially in rows by using the second controller corresponding to the fixation area, and simultaneously scan the non-fixation area in multiple rows by using the second controller corresponding to the non-fixation area.

As an optional implementation, in a condition that difference degrees between sub-images in the fixation area in the next frame image and in the current frame image are greater than the image threshold, and difference degrees between sub-images in the non-fixation area in the next frame image and in the current frame image are less than or equal to the image threshold, the processor is further configured to: load a control signal to each group of GOA circuits in the second controller corresponding to the fixation area, and unload a control signal to each group of GOA circuits in the second controller corresponding to the non-fixation area.

As an optional implementation, the processor is further configured to: in response to a specified operation for an any region in the display region, determine a first sub-image, corresponding to the any region, in the next frame image; control the first sub-image in the next frame image to be refreshed and displayed by using a first controller corresponding to the any region.

As an optional implementation, the processor is further configured to: send the fixation point coordinates to a graphics processing unit (GPU) for the GPU to determine the plurality of display areas according to the fixation point coordinates and to compress sub-images corresponding to different display areas in the next frame image according to different compression ratios; and/or, send location information of the plurality of display areas and identification information corresponding to the plurality of display areas to the GPU for the GPU to compress sub-images corresponding to different display areas in the next frame image according to different compression ratios, wherein the identification information is used for representing the driving chip.

As an optional implementation, the plurality of display areas include a fixation area and a non-fixation area; and sub-images corresponding to the fixation area in the next frame image are uncompressed images, and sub-images corresponding to the non-fixation area in the next frame image are compressed images; or a compression ratio of the sub-images corresponding to the fixation area in the next frame image is lower than a compression ratio of the sub-images corresponding to the non-fixation area in the next frame image.

As an optional implementation, the fixation area includes a boundary area; and sub-images corresponding to the boundary area in the next frame image are images including compressed image data and uncompressed image data.

As an optional implementation, the display screen is configured to display 3D images of different viewing angles, and image contents of the 3D images of different viewing angles are different.

As an optional implementation, the processor is further configured to: transmit the fixation point coordinates to the first controllers, so that the first controller determines the plurality of display areas according to the fixation point coordinates and uses driving chips corresponding to the plurality of display areas for refreshing and displaying; and/or, transmit location information of the plurality of display areas and identification information corresponding to the plurality of display areas to the first controllers, so that the first controller uses driving chips corresponding to the plurality of display areas for refreshing and displaying.

As an optional implementation, the processor is further configured to: obtain the fixation point coordinates of the user on the display screen of the display device by a camera device, wherein the camera device is integrated on the display device.

In the third aspect, some embodiments of the present disclosure further provides a device for partition display, including: a display acquisition unit configured to receive and display a current frame image for the display device, and obtain the fixation point coordinates of the user on the display screen of the display device; an area partition unit configured to divide a display region of the display screen into a plurality of display areas according to the fixation point coordinates, and determine first controllers respectively corresponding to the plurality of display areas, wherein each of the first controllers includes at least one driving chip; and a partition display unit configured to receive a next frame image, and control the next frame image for being displayed in the plurality of display areas by using the first controllers, respectively, wherein the next frame image includes a plurality of sub-images, and one display region is used for displaying one sub-image.

As an optional implementation, the plurality of display areas include a fixation area and a non-fixation area. The area partition unit is further configured to: divide the display region into the fixation area and the non-fixation area according to the fixation point coordinates and a viewing angle range of the user, wherein sub-images displayed in the fixation area are within the viewing angle range, and sub-images displayed in the non-fixation area exceed the viewing angle range.

As an optional implementation, the fixation area includes a boundary area, and the boundary area is determined according to a display cell controlled by the driving chip corresponding to a boundary of the fixation area, wherein the display region includes a plurality of display cells, and each of the plurality of display cells is controlled for display through one driving chip.

As an optional implementation, the partition display unit is further configured to: control, according to a difference degree between sub-images in the next frame image and in the current frame image, the next frame image for being displayed in the plurality of display areas by using the first controllers.

As an optional implementation, the partition display unit is further configured to: in a condition that difference degrees between a part of sub-images in the next frame image and in the current frame image are greater than an image threshold, refresh and display the part of sub-images in the next frame image; or in a condition that difference degrees between all sub-images in the next frame image and in the current frame image are greater than the image threshold, refresh and display all the sub-images in the next frame image.

As an optional implementation, the plurality of display areas include a fixation area and a non-fixation area. The partition display unit is further configured to: in a condition that difference degrees between sub-images in the fixation area in the next frame image and in the current frame image are greater than the image threshold, and difference degrees between sub-images in the non-fixation area in the next frame image and in the current frame image are less than or equal to the image threshold, refresh and display the sub-images in the fixation area in the next frame image by using the first controller corresponding to the fixation area.

As an optional implementation, in a condition that the difference degrees between a part of sub-images in the next frame image and in the current frame image are greater than the image threshold, the partition display unit is further configured to: determine a first display area corresponding to the part of sub-images, and turn on an operational amplifier (OP) of the driving chip in the first controller corresponding to the first display area; and determine a second display area corresponding to sub-images other than the part of the sub-images, and turn off the OP of the driving chip in the first controller corresponding to the second display area.

As an optional implementation, the partition display unit is further configured to: determine second controllers respectively corresponding to the plurality of display areas, wherein each of the second controllers includes at least one group of gate driver on array (GOA) circuits, and each group of GOA circuits is controlled through a separate signal; and scan the plurality of display areas by using the second controllers to refresh and display sub-images corresponding to the plurality of display areas.

As an optional implementation, the plurality of display areas include a fixation area and a non-fixation area. The partition display unit is further configured to: in a condition that difference degrees between sub-images in the fixation area in the next frame image and in the current frame image are greater than an image threshold, and difference degrees between sub-images in the non-fixation area in the next frame image and in the current frame image are less than or equal to the image threshold, scan the fixation area sequentially in rows by using the second controller corresponding to the fixation area; or in a condition that difference degrees between all sub-images in the next frame image and in the current frame image are greater than an image threshold, scan the fixation area sequentially in rows by using the second controller corresponding to the fixation area, and simultaneously scan the non-fixation area in multiple rows by using the second controller corresponding to the non-fixation area.

As an optional implementation, in a condition that difference degrees between sub-images in the fixation area in the next frame image and in the current frame image are greater than the image threshold, and difference degrees between sub-images in the non-fixation area in the next frame image and in the current frame image are less than or equal to the image threshold, the partition display unit is further configured to: load a control signal to each group of GOA circuits in the second controller corresponding to the fixation area, and unload a control signal to each group of GOA circuits in the second controller corresponding to the non-fixation area.

As an optional implementation, the partition display unit is further configured to: in response to a specified operation for an any region in the display region, determine a first sub-image, corresponding to the any region, in the next frame image; control the first sub-image in the next frame image to be refreshed and displayed by using a first controller corresponding to the any region.

As an optional implementation, the device further includes a first transmitting unit, which is further configured to: send the fixation point coordinates to a graphics processing unit (GPU) for the GPU to determine the plurality of display areas according to the fixation point coordinates and to compress sub-images corresponding to different display areas in the next frame image according to different compression ratios; and/or, send location information of the plurality of display areas and identification information corresponding to the plurality of display areas to the GPU for the GPU to compress sub-images corresponding to different display areas in the next frame image according to different compression ratios, wherein the identification information is used for representing the driving chip.

As an optional implementation, the plurality of display areas include a fixation area and a non-fixation areas; and sub-images corresponding to the fixation area in the next frame image are uncompressed images, and sub-images corresponding to the non-fixation area in the next frame image are compressed images; or a compression ratio of the sub-images corresponding to the fixation area in the next frame image is lower than a compression ratio of the sub-images corresponding to the non-fixation area in the next frame image.

As an optional implementation, the fixation area includes a boundary area. The sub-images corresponding to the boundary area in the next frame image are images including compressed image data and uncompressed image data.

As an optional implementation, the display screen is configured to display 3D images of different viewing angles, and image contents displayed in the 3D images of different viewing angles are different.

As an optional implementation, the device further includes a second transmitting unit which is further configured to: transmit the fixation point coordinates to the first controllers, so that the first controller determines the plurality of display areas according to the fixation point coordinates and uses driving chips corresponding to the plurality of display areas for refreshing and displaying; and/or, transmit location information of the plurality of display areas and identification information corresponding to the plurality of display areas to the first controllers, so that the first controller uses driving chips corresponding to the plurality of display areas for refreshing and displaying.

As an optional implementation, the display acquisition unit is further configured to: obtain the fixation point coordinates of the user on the display screen of the display device by a camera device, wherein the camera device is integrated on the display device.

In the fourth aspect, some embodiments of the present disclosure further provides a computer storage medium, on which a computer program is stored, wherein when the computer program is executed by a processor, steps of the method in the first aspect are implemented.

These or other aspects of the present application will be more concise and understandable in the following embodiments.

BRIEF DESCRIPTION OF FIGURES

In order to more clearly illustrate the technical solutions in the embodiments of the present disclosure, the drawings required in the description of the embodiments will be briefly introduced below, and it is obvious that the drawings in the following description are only some embodiments of the present disclosure, and for those skilled in the art, other drawings can also be obtained according to these drawings without paying creative labor.

DETAILED DESCRIPTION

Figure 1:
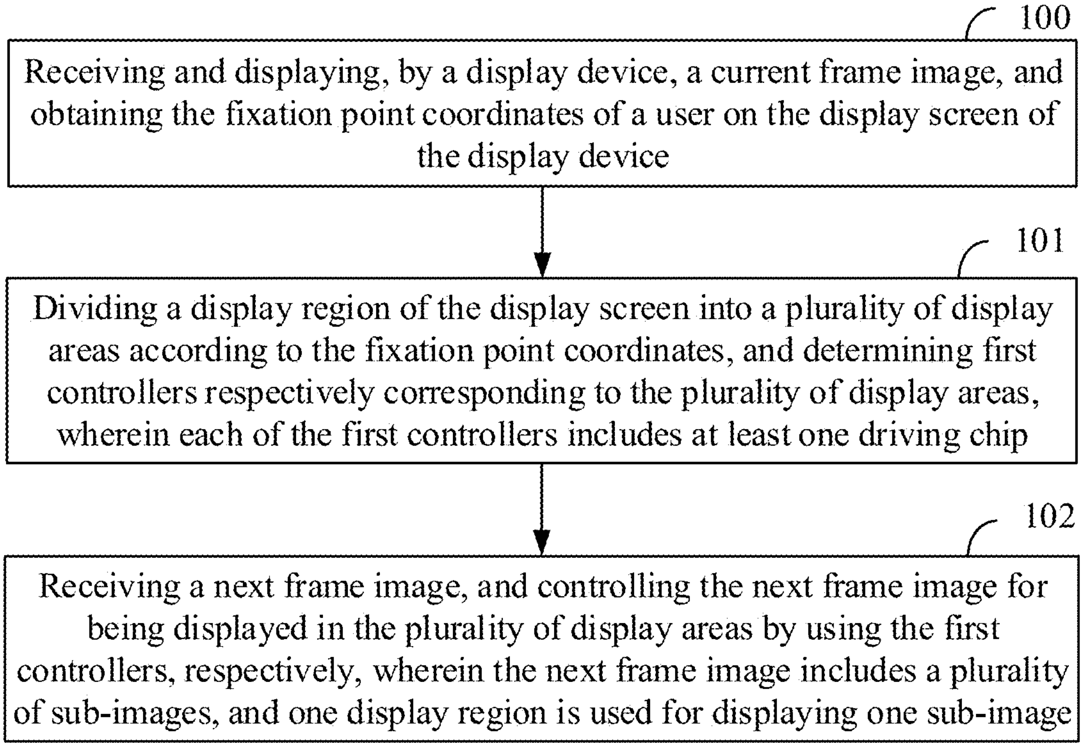
FIG. 1 is a flow chart for a method for partition display provided by an embodiment of the present disclosure.

In order to make the purpose, technical solution and advantages of the present disclosure more clear, the present disclosure will be described in further detail below in conjunction with the accompanying drawings, obviously, the described embodiments are only part of the embodiments of the present disclosure, not all embodiments. Based on the embodiments in the present disclosure, all other embodiments obtained by those skilled in the art without making creative work belong to the scope of protection of the present disclosure.

In the embodiment of the present disclosure, the term "and/or" describes the association relationship of the associated object, indicating that there can be three kinds of relations, for example, A and/or B, which can be expressed: the existence of A alone, the existence of A and B at the same time, and the existence of B alone. The character "/" generally indicates that the relationship between the preceding and posting objects is an "or".

The application scenario described in the embodiment of the present disclosure is to more clearly illustrate the technical solution of the embodiment of the present disclosure, and does not constitute a limitation on the technical solution provided in the embodiment of the present disclosure. In the description of the present disclosure, unless otherwise indicated, "plurality/multiple" means two or more of them.

Compared with traditional interaction methods, the human-computer interaction system designed based on eye tracking technology shows more direct and efficient advantages, so as to better realize the idea of human-computer interaction (i.e., WYSIWYG). On this basis, the use of eye tracking technology with the help of display devices, and the use of fixation point instead of manual operations, can more conveniently complete human-computer interaction. In the current display scheme combined with eye tracking technology, after obtaining the human eye image and extracting the coordinates of the fixation point of the human eyes, the GPU (Graphics Processing Unit) converts the coordinates of fixation point of the human eyes, and the GPU needs to divide the to-be-displayed image data into multiple pieces of grid data in advance, and the grid data is arranged according to the rules and sent to the display device for output.

At present, in the existing 3D display scheme, the data of multiple views (view angle) needs to be arranged in advance at the front end (GPU) and the data is sent to the display driving chip for output. The driving chip does not process and filter the display data, and in combination with human eye tracking technology, it cannot quickly update the information of different viewing positions, and the viewing effect is average. Affected by the system architecture of the current display scheme, when the human eyes move rapidly, it is difficult for the display device to respond in time, which makes the displayed image data produce a sense of lag and affect the viewing effect.

The embodiment provides a method for partition display that can be performed by the display device, the core idea is to divide the display region into multiple display regions according to the fixation point coordinates of the user on the current frame image, utilize first controllers corresponding to multiple display regions to refresh and display the sub-images in the next frame image respectively according to a certain rule. Because the display device in the embodiment can directly obtain the fixation point coordinates, when the human eyes move rapidly, it can partition based on the fixation point coordinates, so as to respond in time, and refresh and display the next frame image in different display areas to reduce the discomfort caused by delay. Moreover, it is convenient for adopting different refresh display manners in different display areas by partitioning the display region, so as to achieve the purpose of combining timely response and power saving.

As shown in FIG. 1, an embodiment provides a method for partition display, and the specific implementation process of the method is as follows.

Step 100, the display device receives and displays the current frame image, obtains the fixation point coordinates of a user on the display screen of the display device.

In some embodiments, the display device in the embodiments is capable of displaying a 2D image(s) and a 3D image(s). The display screen is used for displaying 3D images of different viewing angles when displaying 3D images, and the image contents displayed in the 3D images of the different viewing angles are different. Combined with eye tracking technology, when the human eyes move, the 3D image of the corresponding viewing angle can be displayed according to a viewing angle of the current human eyes, so that the 3D object can be displayed from different viewing angles.

In the implementation, when displaying a 3D image, the concept of a pixel island is proposed. Each pixel island (RGB) for display includes a plurality of pixels. Each pixel is displayed as a viewing angle. Each pixel island includes pixels of different viewing angles, and the data of pixels of different viewing angles is different, that is, the image contents displayed in different viewing angles are different, which is convenient to respond to the fixation point of the rotation of the human eyes, and refresh and display the 3D image under the viewing angle corresponding to the fixation point in time.

In some embodiments, a camera device is utilized to obtain the coordinates of the fixation point of the user on the display screen of the display device, and the camera device is integrated on the display device. In the implementation, the camera device first needs to collect a human eye image, and identify the fixation point coordinates of the human eyes on the display screen by extracting the human eye features in the human eye image. In the embodiment, the camera device integrated on the display device can be utilized to obtain the fixation point coordinates, so that the fixation point coordinates are directly converted, and the rapid response for the human eye tracking is realized.

Step 101, the display region of the display screen is divided into a plurality of display areas according to the fixation point coordinates, and first controllers respectively corresponding to the plurality of display areas are determined. The first controller includes at least one driving chip.

In some embodiments, the display region is divided into a fixation area and a non-fixation area. The display region is divided into a fixation area and a non-fixation area according to the fixation point coordinates and the viewing angle range of the user. The sub-images displayed in the fixation area are located within the viewing angle range, and the sub-images displayed in the non-fixation area exceed the viewing angle range.

In the implementation, when the camera captures the image and extracts the features of the human eyes, the camera captures the fixation point coordinates (x, y, z) of a fixation point of the human eyes on the display screen. Combined with the viewing angle of the human eyes (the viewing center area is between the viewing angles of 5° to 8°), the fixation point coordinates are calculated, and the range of the fixation area of the human eyes can be obtained.

In some embodiments, the display region includes a plurality of display cells, each of plurality of display cells is controlled for display through a driving chip. The fixation area includes a boundary area. The boundary area is determined according to the display cell controlled by the driving chip corresponding to a boundary of the fixation area.

In the embodiments, all driving chips (source drivers) of display device are identified, the driving chip ID(s) corresponding to the fixation area and the driving chip ID(s) corresponding to the non-fixation area are determined in combination with a pixel range occupied by the fixation area on the display screen, and the contents that different driving chips are immediately to transmit are marked.

Figure 2:
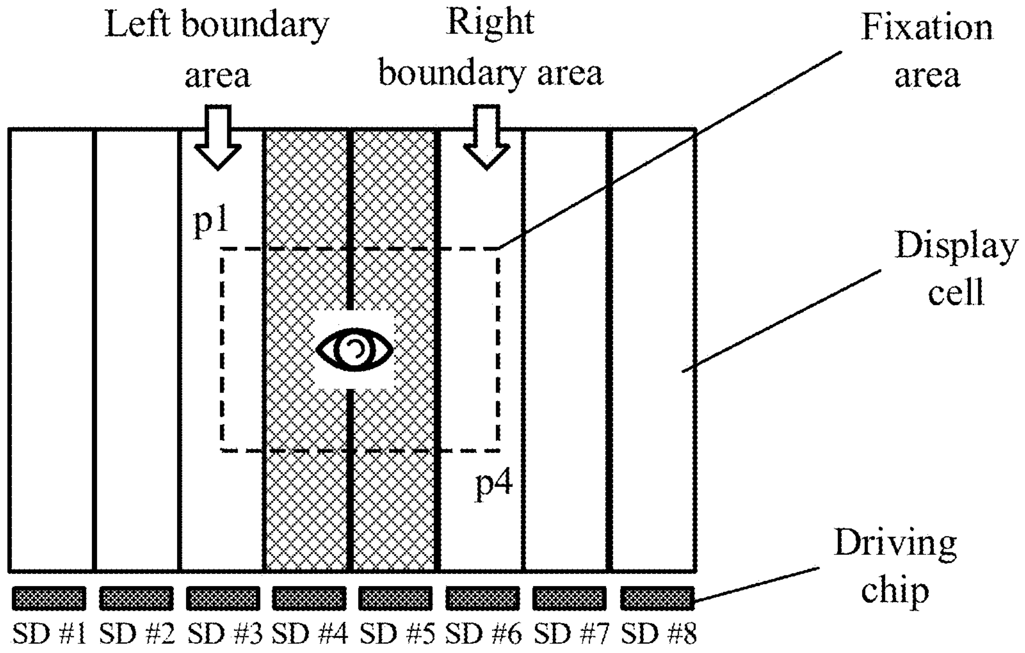
FIG. 2 is a schematic diagram of a fixation area of human eyes on a display screen provided by an embodiment of the present disclosure.

As shown in FIG. 2, a schematic diagram of a fixation area of the human eyes on a display screen is provided in the embodiment. The display region is divided into a plurality of display cells on the X-axis, each display cell corresponds to one driving chip. Each driving chip is used for controlling the corresponding display cell for display. After dividing to obtain a plurality of display areas, it is also necessary to determine the driving chip corresponding to each display region. In the figure, the driving chip SD #4 and the driving chip SD #5 correspond to the fixation area; the driving chip SD #3 and the driving chip SD #5 correspond to the boundary area of the fixation area; the driving chip SD #1, the driving chip SD #2, the driving chip SD #7, and the driving chip SD #8 correspond to the non-fixation area.

Step 102, the next frame image is received, and the first controllers are utilized to control the next frame image for being displayed in the plurality of display areas, respectively. The next frame image includes a plurality of sub-images, and one display region is used for displaying one sub-image.

In some embodiments, the first controllers are utilized to control the next frame image for being displayed in the plurality of display areas according to a difference degree between sub-images in the next frame image and in the current frame image in the embodiments.

In some embodiments, the following manners are used for display.

Manner 1: Partition Display

In the implementation, if the difference degrees between a part of sub-images in the next frame image and in the current frame image are greater than an image threshold, a part of the sub-images in the next frame image is refreshed and displayed.

Optionally, the plurality of display areas include a fixation area and a non-fixation area.

If difference degrees between sub-images in the fixation area in the next frame image and in the current frame image are greater than the image threshold, and difference degrees between sub-images in the non-fixation area in the next frame image and in the current frame image are less than or equal to the image threshold, the sub-images in the fixation area in the next frame image are refreshed and displayed by using the first controller(s) corresponding to the fixation area.

In the implementation, if difference degrees between sub-images in the fixation area in the next frame image and in the current frame image are greater than the image threshold, and difference degrees between sub-images in the non-fixation area in the next frame image and in the current frame image are less than or equal to the image threshold, only the fixation area is refreshed and the non-fixation area is not refreshed. The sub-images corresponding to the current frame image in the non-fixation area may be retained and continue to be displayed in the non-fixation area.

In some embodiments, if the difference degrees between a part of sub-images in the next frame image and in the current frame image are greater than the image threshold, the purpose of saving power consumption can also be achieved through the following steps: determining a first display area corresponding to the part of sub-images, and turning on an operational amplifier (OP) of the driving chip in the first controller corresponding to the first display area; and determining a second display area corresponding to sub-images other than the part of the sub-images, and turning off the OP of the driving chip in the first controller corresponding to the second display area.

Optionally, the first display area in the embodiment is the fixation area, and the second display area in the embodiment is the non-fixation area. Alternatively, the first display area in the embodiment is the non-fixation area, and the second display area in the embodiment is the fixation area.

In implementation, the plurality of display areas include the fixation area and the non-fixation area. When only the sub-images in the fixation area are refreshed by utilizing the first controller(s) corresponding to the fixation area, the OP of the driving chip in the first controller(s) corresponding to the fixation area is turned on, and the OP of the driving chip in the first controller(s) corresponding to the non-fixation area is turned off.

In some embodiments, when displaying in the embodiment, the first controller and the second controller jointly control for the refreshing and displaying, and the control maaner of the second controller is as follows: determining second controllers respectively corresponding to the plurality of display areas, wherein each of the second controllers includes at least one group of gate driver on array (GOA) circuits, and each group of GOA circuits is controlled through a separate signal; and scanning the plurality of display areas by using the second controllers to refresh and display sub-images corresponding to the plurality of display areas.

In some embodiments, the plurality of display areas include a fixation area and a non-fixation area. In the embodiment, the second controllers are utilized to scan the plurality of display areas through the following steps: if difference degrees between sub-images in the fixation area in the next frame image and in the current frame image are greater than an image threshold, and difference degrees between sub-images in the non-fixation area in the next frame image and in the current frame image are less than or equal to the image threshold, scanning the fixation area sequentially in rows by using the second controller corresponding to the fixation area.

In the implementation, when only the fixation area is refreshed, only image data in the fixation area of the next frame image is received, and the image data is refreshed and displayed, while the image data in the non-fixation area of the current frame image is still retained as the image data in the non-fixation area of the current frame image, thereby reducing data transmission.

In some embodiments, if difference degrees between sub-images in the fixation area in the next frame image and in the current frame image are greater than the image threshold, and difference degrees between sub-images in the non-fixation area in the next frame image and in the current frame image are less than or equal to the image threshold, a control signal is loaded to each group of GOA circuits in the second controller corresponding to the fixation area, and the control signal is not loaded to each group of GOA circuits in the second controller corresponding to the non-fixation area.

Optionally, when the plurality of display areas divided in the display screen include a fixation area and a non-fixation area, if difference degrees between sub-images in the fixation area in the next frame image and in the current frame image are greater than the image threshold, and difference degrees between sub-images in the non-fixation area in the next frame image and in the current frame image are less than or equal to the image threshold, the control signal STV is loaded to each group of GOA circuits in the second controller corresponding to the fixation area, and the control signal STV is unloaded to each group of GOA circuits in the second controller corresponding to the non-fixation area.

Figure 3:
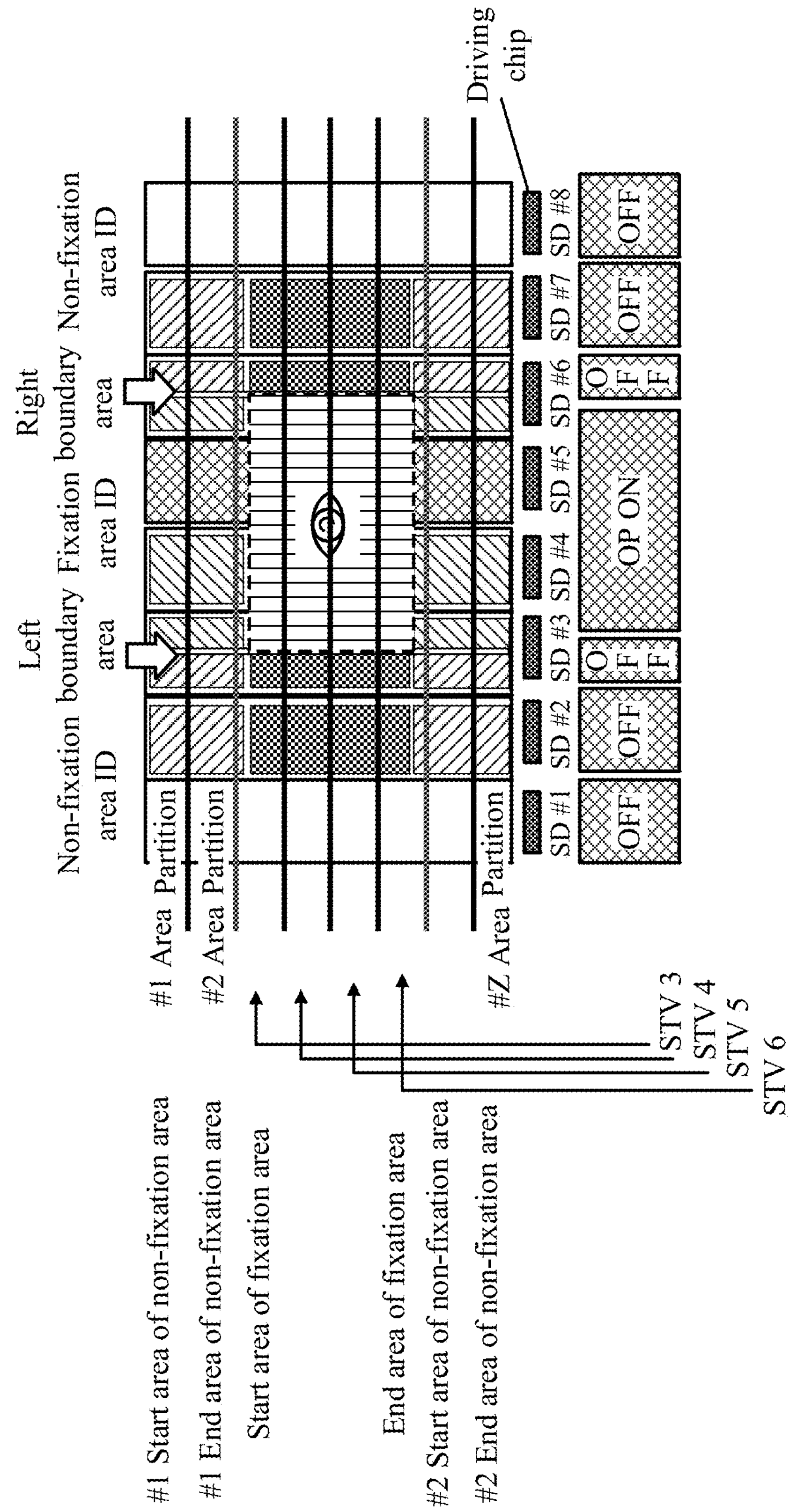
FIG. 3 is a schematic diagram of refreshing a picture in a fixation area provided by an embodiment of the present disclosure.

As shown in FIG. 3, a schematic diagram of refreshing a picture in the fixation area is provided by the embodiment. In the X direction, the states of the 8 driving chips SD ICs are defined according to the size of the fixation area, in which: SD #1, SD #2, SD #7, and SD #8 correspond to the non-fixation area, SD #4, and SD #5 correspond to the fixation area, and SD #3, and SD #6 correspond to the boundary area. In the Y direction, the Z groups of area partitions are set, and the groups of GOA circuits are independent of each other and controlled by separated control signals (STV signals). In the condition of only refreshing the fixation area, rows of area partitions corresponding to the fixation area are each turned on from top to bottom, and the refreshing is performed through the STV signal from a start area of the fixation area to an end area of the fixation area. The STV signal of the area partition corresponding to the non-fixation area is not unloaded. At the same time, the OP of the driving chip(s) contained in the fixation area in the X direction is turned on, and all image data in the fixation area are transmitted, and the content in the fixation area is updated, the content of the current frame image in the non-fixation area is kept unchanged, and the OP of the driving chip(s) contained in the non-fixation area in the X direction is turned off.

It should be noted that when the displayed image is a 3D image, one implementation is that one pixel island includes 16 sub-pixels respectively corresponding to 16 views (viewing angles) of the 3D picture, and a part of sub-pixels is turned on according to the fixation range of the human eyes. When the displayed image is a 2D image, the image contents of the 16 sub-pixels contained in one pixel island are the same.

Manner 2: Whole Frame Display

In the implementation, if difference degrees between all sub-images in the next frame image and in the current frame image are greater than the image threshold, all the sub-images in the next frame image are refreshed and displayed.

In some embodiments, the plurality of display areas include a fixation area and a non-fixation area. If the difference degrees between sub-images in the next frame image and in the current frame image are greater than the image threshold, the first controller(s) corresponding to the fixation area is used to refresh and display the sub-images in the fixation area in the next frame image, and the first controller(s) corresponding to the non-fixation area is used to refresh and display the sub-images in the non-fixation area in the current frame image.

In some embodiments, second controllers respectively corresponding to the plurality of display areas are determined, wherein each of the second controllers includes at least one group of gate driver on array (GOA) circuits, and each group of GOA circuits is controlled through a separate signal. The plurality of display areas are scanned by using the second controllers to refresh and display sub-images corresponding to the plurality of display areas.

Optionally, the plurality of display areas include a fixation area and a non-fixation area. In the embodiment, the second controllers are utilized to scan the plurality of display areas through the following steps: if difference degrees between all sub-images in the next frame image and in the current frame image are greater than an image threshold, scanning the fixation area sequentially in rows by using the second controller corresponding to the fixation area, and simultaneously scanning the non-fixation area in multiple rows by using the second controller corresponding to the non-fixation area.

In the implementation, when refreshing and displaying sub-images that are in the non-fixation area in the current frame image, because after the sub-images in the non-fixation area are compressed, part of the data may be lost, and the resolution of the current display screen cannot be satisfied, so the pixels in the image data in the non-fixation area in the next frame image can be transmitted by replication, that is, the same image data are adopted in multiple rows, and only the image data of the sub-images in the non-fixation area in the next frame image needs to be replicated, thereby reducing the amount of data transmission while meeting the display requirements. At the same time, the refreshing and displaying can be performed by using GOA circuits corresponding to multiple rows for refreshing at the same time.

Figure 4:
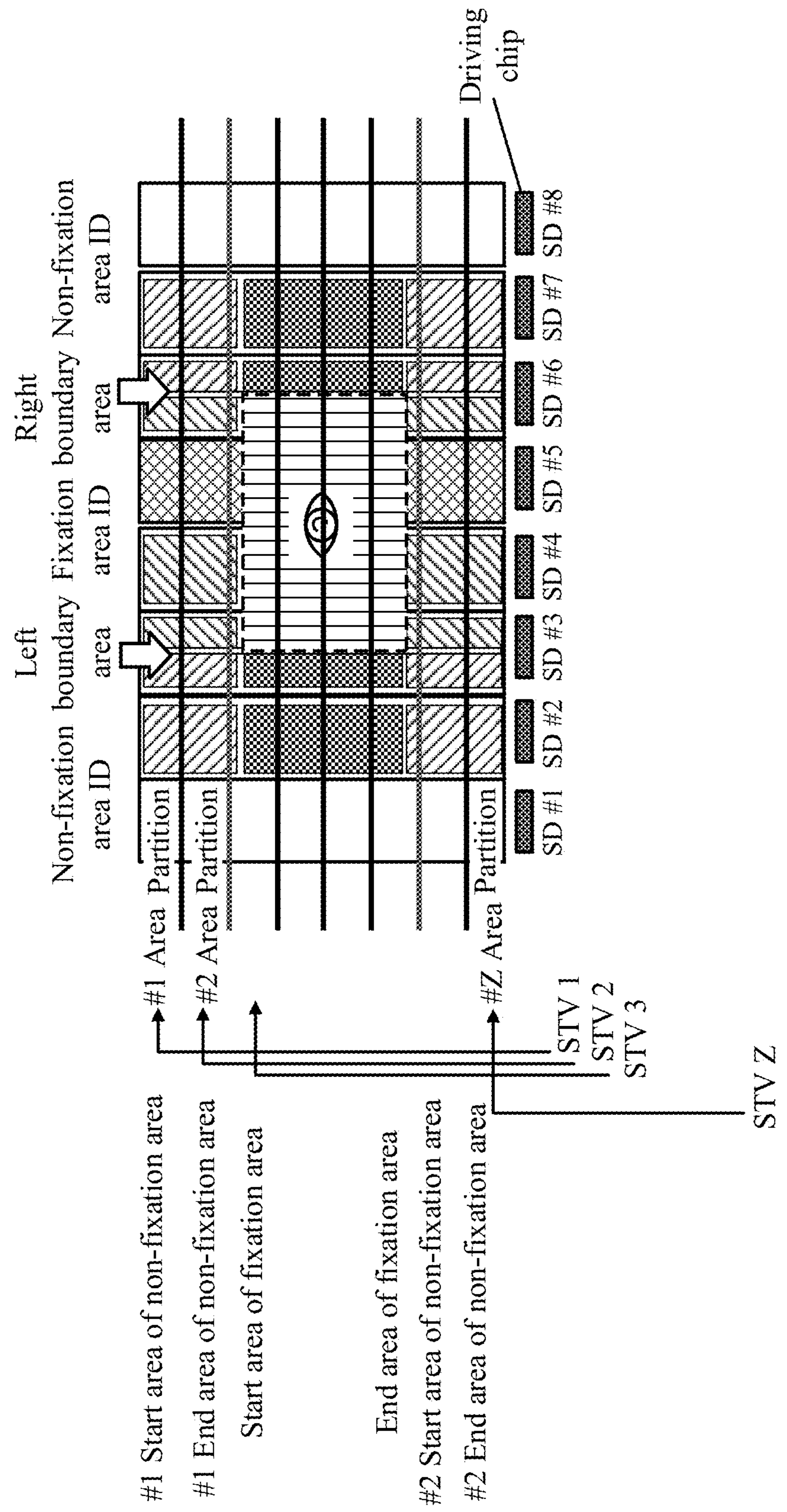
FIG. 4 is a schematic diagram of refreshing a whole frame picture provided by an embodiment of the present disclosure.

As shown in FIG. 4, a schematic diagram of refreshing a whole frame picture is provided by the embodiment. In the X direction, the states of 8 driving chips SD ICs are defined according to the size of the fixation area, in which: SD #1, SD #2, SD #7, and SD #8 correspond to the non-fixation area, SD #4, and SD #5 correspond to the fixation area, SD #3, and SD #6 correspond to the boundary area. In the Y direction, the Z groups of area partitions are set, and the groups of the GOA circuits are independent of each other and controlled by separate control signals (STV signals). When refreshing the whole frame, area partitions are turned on sequentially from top to bottom, in which rows of area partition in the fixation area are sequentially turned on, and multiple rows of area partitions in the non-viewing area are turned on simultaneously, which is used to reduce the amount of data transmission. At the same time, all image data in the fixation area in the X direction are transmitted, and the image data in the non-fixation area is transmitted by means of pixel replication.

Manner 3: Refresh the Display in Any Region

In response to a specified operation for an any region in the display region, a first sub-image, corresponding to the any region, in the next frame image are determined; the first sub-image in the next frame image is controlled to be refreshed and displayed by using a first controller corresponding to the any region.

In the embodiment, the implementation principle of refreshing in the any region is similar to that of refreshing in the fixation area, and the specific embodiment can refer to the above manner 1, which will not be repeated here.

In the implementation, if a difference degree between the first sub-images in the any region in the next frame image and in the current frame image is greater than the image threshold, the first sub-image of the next frame image is refreshed and displayed. The sub-images corresponding to the region other than the any region of the current frame image can be retained and continue to be displayed in the region other than the any region.

In the implementation, the first controller corresponding to the any region is utilized for refreshing and displaying the first sub-image, turning on the OP of the driving chip in the first controller corresponding to the any region, and turning off the OP of the driving chip in the first controller(s) corresponding to the regions other than the any region.

In the implementation, if the difference degree between the first sub-images in the any region in the next frame image and in the current frame image is greater than the image threshold, the second controller corresponding to the any region is used to scan in the any region sequentially in rows, the control signal is loaded to each group of GOA circuits in the second controller corresponding to the any region, and the control signal is not loaded to each group of GOA circuits in the second controller(s) corresponding to the regions other than the any region.

An implementation is that, in a certain scenario, in the embodiment, the refreshing and displaying can only be performed in the region where the cursor is.

In some embodiments, any one or more items of the following is performed in the embodiments.

The first item: the fixation point coordinates ar sent to a GPU for the GPU to determine the plurality of display areas according to the fixation point coordinates and to compress sub-images corresponding to different display areas in the next frame image according to different compression ratios.

The second item: location information of the plurality of display areas and identification information corresponding to the plurality of display areas are sent to the GPU for the GPU to compress sub-images corresponding to different display areas in the next frame image according to different compression ratios, wherein the identification information is used for representing the driving chip.

In the implementation, the location information of the fixation area and the identification information of the driving chip corresponding to the fixation area can be sent to the GPU. It is also possible to send only the fixation point coordinates to the GPU.

In some embodiments, after the fixation point coordinates and/or the location information of the fixation area and the identification information of the driving chip corresponding to the fixation area are sent to the GPU, the GPU compresses the images corresponding to the fixation area and the non-fixation area according to different compression ratios. The specific compression manner is as follows. (1) Sub-images corresponding to the fixation area in the next frame image are uncompressed images, and sub-images corresponding to the non-fixation area in the next frame image are compressed images. In this manner, the sub-images in the fixation area are not compressed, and the sub-images in the non-fixation area are compressed. (2) A compression ratio of the sub-images corresponding to the fixation area in the next frame image is lower than a compression ratio of the sub-images corresponding to the non-fixation area in the next frame image.

In the implementation, after the TCON module of the display device obtains the coordinate information of the fixation area, the coordinate information of the fixation area is fed back to the GPU, and the next frame image data to be transmitted is compressed at different ratios according to the fixation area/non-fixation area. Since the human eyes are relatively insensitive to the contents in the non-fixation area, the display stream compression (DSC) with a high compression ratio can be used for data compression, and even if the decompressed data is distorted compared to the original data, it will not be recognized by the human eyes, and the amount of data transmission can be greatly reduced. For the content of the fixation area, the lossless compression/non-compression can be used to ensure the display effect of the areas that the human eyes focus on. Before compression, the image is divided into a multi-clip grid. Each clip is encoded and decoded independently to ensure that transmission errors don't affect other clips.

Optionally, the fixation area includes a boundary area. Sub-images corresponding to the boundary area in the next frame image are images including compressed image data and uncompressed image data. In the implementation, the image data in the boundary area is partially compressed.

In some embodiments, the fixation point coordinates are transmitted to the first controllers, so that the first controller determines the plurality of display areas according to the fixation point coordinates and uses driving chips corresponding to the plurality of display areas for refreshing and displaying; and/or, location information of the plurality of display areas and identification information corresponding to the plurality of display areas are transmitted to the first controllers, so that the first controller uses driving chips corresponding to the plurality of display areas for refreshing and displaying.

Figure 5:
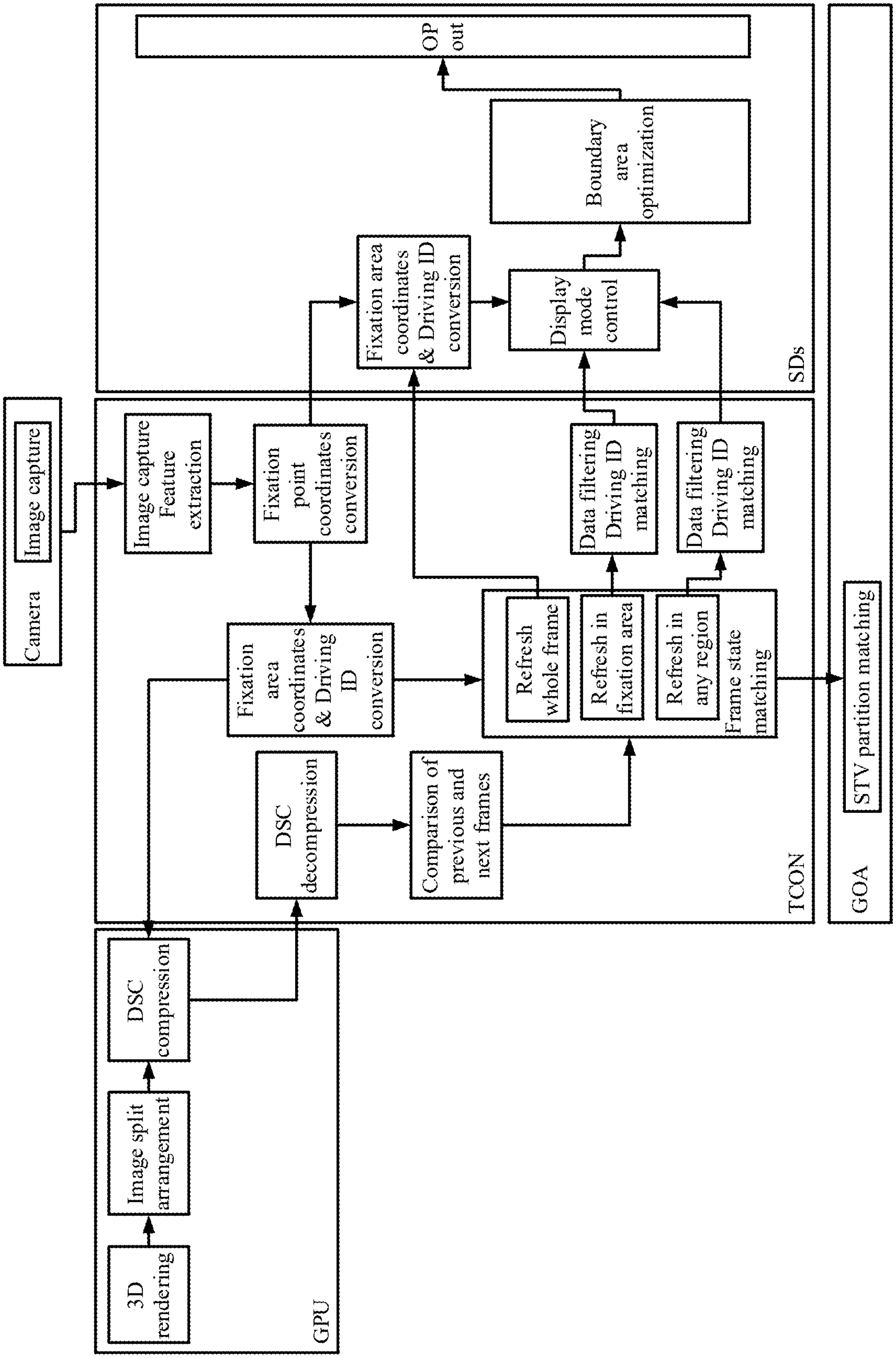
FIG. 5 is a schematic diagram of a system framework of a display device for partition display provided by an embodiment of the present disclosure.

As shown in FIG. 5, a system framework diagram for partition display of a display device is further provided in the embodiment. The display device includes a TCON (timing controller) module, a GOA module and a driving module, and further includes an integrated camera. In the implementation, the camera captures images (including a human eye image), and the TCON module performs feature extraction on the captured human eye image, identifies the fixation point coordinates of the human eyes on the display screen, determines the fixation area and the non-fixation area according to the fixation point coordinates and further determines the identification of the driving chip corresponding to the fixation area and the identification of the driving chip corresponding to the non-fixation area, and sends the coordinate information of the fixation area to the GPU and the driving chip. The GPU performs lossless compression or no compression on the sub-image corresponding to the fixation area in the next frame image to be transmitted to the TCON module, and performs the DSC compression on the sub-image corresponding to the non-fixation area and transmits compressed sub-image to the TCON module. After the TCON module decompresses the received next frame image, it determines the difference degrees between the sub-images in the fixation area and the non-fixation area in the next frame image and the current frame image, which includes the following refresh modes.

Mode 1, Refreshing Only in the Fixation Area

If the difference degrees between the sub-images in the fixation area in the next frame image and in the current frame image are greater than the image threshold, and the difference degrees between the sub-images in the non-fixation area in the next frame image and in the current frame image are less than or equal to the image threshold, then the refreshing is only performed in the fixation area, the OP of the driving chip corresponding to the fixation area is turned on and the STV signal is loaded to each group of GOA circuits corresponding to the fixation area, and the OP of the driving chip corresponding to the non-fixation area is turned off and the STV signal is not loaded to each group of GOA circuits corresponding to the non-fixation area.

Mode 2, Refreshing the Whole Frame.

If the difference degrees between all the sub-images in the next frame image and in the current frame image are greater than the image threshold, the first controller(s) corresponding to the fixation area is used to refresh and display the sub-image(s) in the fixation area in the next frame image, and the first controller(s) corresponding to the non-fixation area is used to refresh and display the sub-image(s) in the non-fixation area in the current frame image, that is, the image data of the sub-image(s) in the fixation area in the next frame image is transmitted to the driving chip, and the image data of the sub-image(s) in the non-fixation area is transmitted in the mode of pixel replication. That is, part of the pixel data of the next frame image in the non-fixation area is transmitted to reduce the amount of data transmission. the GOA circuits corresponding to the fixation area are utilized to scan the fixation area sequentially in rows, and the GOA circuit corresponding to the non-fixation area are utilized to synchronously scan the non-fixation area in multiple rows. The driving chips are distributed in the X-axis direction, and the groups of GOA circuits is distributed in the Y-axis direction.

Mode 3: Refreshing Any Frame

If the difference degrees between the sub-images in the any region in the next frame image and in the current frame image are greater than the image threshold, and the difference degrees between the sub-images in the region other than the any region in the next frame image and in the current frame image are less than or equal to the image threshold, then the refreshing is only performed in the any region, and the image data of the region other than the any region still retains the pixel data of the current frame image in the region other than the any region, and the OP of the driving chip corresponding to the any region is turned on and the STV signal is loaded to each group of GOA circuits corresponding to the any region, the driving chip OP corresponding to the region other than the any region is turned off and the STV signal is not loaded to each group of GOA circuits corresponding to the region other than the any region.

In the embodiment, according to the fixation point coordinates fed back by the eye tracking, the GPU, TCON, and the driving chip (source driver IC) are linked to intelligently partitioning display for the display modes (including 3D, 2D, and light field 3D) and the refresh modes (refreshing the whole frame, only refreshing in the fixation area, and refreshing in any region) in the current state. The fixation point coordinates of the human eyes collected by the external camera are processed, and the center point coordinates are converted by the TCON, and combined with the identification information ID of the source driver IC to compress/decompress the sub-image data corresponding to different driving chips by the front end GPU. Then according to the image data of the previous and next frames and the corresponding application scenarios, the image data sent by the front end is filtered. If the whole frame data is refreshed, all the data sent by the front end is directly arranged according to the requirements of the driving chip, and the data is output according to the fixation area/non-fixation area of each driving chip. When the refreshing is only performed in the fixation area the data from the previous frame is retained in the non-fixation area. The TCON needs to filter the image data sent by the front end, send the filtered image data to the corresponding driving chip (the driving chips and the number of rows corresponding to the fixation area are matched). The transmission according to the pre-set display mode can speed up the response speed of the corresponding data in the fixation area. When the human eyes move rapidly, the driving chips directly receive the coordinate information of the fixation area for output, which reduces the discomfort caused by delay. When refreshing in the any region, some special scenes, such as refreshing at the position of the cursor, the data in the previous frame are retained in the rest portion, which reduces power consumption. The filtered data is sent to the corresponding driving chip, and combining with the corresponding GOA partition for specific partition data transmission.

In the embodiments, the display region is divided into the plurality of display areas by means of intelligent partitioning, and according to the image data of the previous frame and the eye tracking situation, what rules need to be followed to update the data in the next frame/current frame are determined, so as to achieve the purpose of combining timely response and power saving. When the human eyes move rapidly, the driving chip directly receives the coordinates for output, reducing the discomfort caused by delay. At the same time, in order to reduce the difference between the fixation area and the non-fixation area, the concept of transition area (boundary area) is introduced, so that the overall display effect can be guaranteed even if the data of the non-fixation area is compressed. According to the different display areas corresponding to different driving chips, the data format is classified, and multiple driving chips are controlled to process the display data with fewer instructions. When only the fixation area/certain region need to be refreshed, the output of the extraneous region is disabled to reduce power consumption. The eye-tracking camera is integrated on the panel side, and the coordinate data is processed by the display end and sent to the front end GPU for reasonable compression, reducing the amount of data transmission.

Based on the same invention conception, a display device is further provided by the embodiments of the present disclosure. Because the display device is the display device in the method in the embodiments of the present disclosure, and the principle of the display device to solve the problem is similar to that of the method, so the implementation of the display device can refer to the implementation of the method, which will not be repeated herein.

Figure 6:
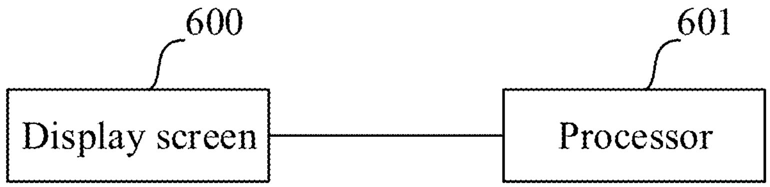
FIG. 6 is a schematic diagram of a display device provided by an embodiment of the present disclosure.

As shown in FIG. 6, the display device includes a display 600 and a processor 601.

The display screen 600 is configured to display contents.

The processor 601 is configured to perform the following steps: receiving and displaying, by a display device, a current frame image, and obtaining fixation point coordinates of a user on a display screen of the display device; dividing a display region of the display screen into a plurality of display areas according to the fixation point coordinates, and determining first controllers respectively corresponding to the plurality of display areas, wherein each of the first controllers includes at least one driving chip; and receiving a next frame image, and controlling the next frame image for being displayed in the plurality of display areas by using the first controllers, respectively, wherein the next frame image includes a plurality of sub-images, and one display region is used for displaying one sub-image.

As an optional implementation, the plurality of display areas include a fixation area and a non-fixation area. The processor 601 is further configured to: divide the display region into the fixation area and the non-fixation area according to the fixation point coordinates and a viewing angle range of the user, wherein sub-images displayed in the fixation area are within the viewing angle range, and sub-images displayed in the non-fixation area exceed the viewing angle range.

As an optional implementation, the fixation area includes a boundary area, and the boundary area is determined according to a display cell controlled by the driving chip corresponding to a boundary of the fixation area, wherein the display region includes a plurality of display cells, and each of the plurality of display cells is controlled for display through one driving chip.

As an optional implementation, the processor 601 is further configured to: control, according to a difference degree between sub-images in the next frame image and in the current frame image, the next frame image for being displayed in the plurality of display areas by using the first controllers.

As an optional implementation, the processor 601 is further configured to: in a condition that difference degrees between a part of sub-images in the next frame image and in the current frame image are greater than an image threshold, refresh and display the part of sub-images in the next frame image; or in a condition that difference degrees between all sub-images in the next frame image and in the current frame image are greater than the image threshold, refresh and display all the sub-images in the next frame image.

As an optional implementation, the plurality of display areas include a fixation area and a non-fixation area. The processor 601 is further configured to: in a condition that difference degrees between sub-images in the fixation area in the next frame image and in the current frame image are greater than the image threshold, and difference degrees between sub-images in the non-fixation area in the next frame image and in the current frame image are less than or equal to the image threshold, refresh and display the sub-images in the fixation area in the next frame image by using the first controller corresponding to the fixation area.

As an optional implementation, in a condition that the difference degrees between a part of sub-images in the next frame image and in the current frame image are greater than the image threshold, the processor 601 is further configured to: determine a first display area corresponding to the part of sub-images, and turn on an operational amplifier (OP) of the driving chip in the first controller corresponding to the first display area; and determine a second display area corresponding to sub-images other than the part of the sub-images, and turn off the OP of the driving chip in the first controller corresponding to the second display area.

As an optional implementation, the processor 601 is further configured to: determine second controllers respectively corresponding to the plurality of display areas, wherein each of the second controllers includes at least one group of gate driver on array (GOA) circuits, and each group of GOA circuits is controlled through a separate signal; and scan the plurality of display areas by using the second controllers to refresh and display sub-images corresponding to the plurality of display areas.

As an optional implementation, the plurality of display areas includes a fixation area and a non-fixation area. The processor 601 is further configured to: in a condition that difference degrees between sub-images in the fixation area in the next frame image and in the current frame image are greater than an image threshold, and difference degrees between sub-images in the non-fixation area in the next frame image and in the current frame image are less than or equal to the image threshold, scan the fixation area sequentially in rows by using the second controller corresponding to the fixation area; or in a condition that difference degrees between all sub-images in the next frame image and in the current frame image are greater than an image threshold, scan the fixation area sequentially in rows by using the second controller corresponding to the fixation area, and simultaneously scan the non-fixation area in multiple rows by using the second controller corresponding to the non-fixation area.

As an optional implementation, in a condition that difference degrees between sub-images in the fixation area in the next frame image and in the current frame image are greater than the image threshold, and difference degrees between sub-images in the non-fixation area in the next frame image and in the current frame image are less than or equal to the image threshold, the processor 601 is further configured to: load a control signal to each group of GOA circuits in the second controller corresponding to the fixation area, and unload a control signal to each group of GOA circuits in the second controller corresponding to the non-fixation area.

As an optional implementation, the processor 601 is further configured to: in response to a specified operation for an any region in the display region, determine a first sub-image, corresponding to the any region, in the next frame image; control the first sub-image in the next frame image to be refreshed and displayed by using a first controller corresponding to the any region.

As an optional implementation, the processor 601 is further configured to: send the fixation point coordinates to a graphics processing unit (GPU) for the GPU to determine the plurality of display areas according to the fixation point coordinates and to compress sub-images corresponding to different display areas in the next frame image according to different compression ratios; and/or, send location information of the plurality of display areas and identification information corresponding to the plurality of display areas to the GPU for the GPU to compress sub-images corresponding to different display areas in the next frame image according to different compression ratios, wherein the identification information is used for representing the driving chip.

As an optional implementation, the plurality of display areas include a fixation area and a non-fixation area; and sub-images corresponding to the fixation area in the next frame image are uncompressed images, and sub-images corresponding to the non-fixation area in the next frame image are compressed images; or a compression ratio of the sub-images corresponding to the fixation area in the next frame image is lower than a compression ratio of the sub-images corresponding to the non-fixation area in the next frame image.

As an optional implementation, the fixation area includes a boundary area; the sub-images corresponding to the boundary area in the next frame image are images including compressed image data and uncompressed image data.

As an optional implementation, the display screen is configured to display 3D images of different viewing angles, and image contents of the 3D images of different viewing angles are different.

As an optional implementation, the processor 601 is further configured to: transmit the fixation point coordinates to the first controllers, so that the first controller determines the plurality of display areas according to the fixation point coordinates and uses driving chips corresponding to the plurality of display areas for refreshing and displaying; and/or, transmit location information of the plurality of display areas and identification information corresponding to the plurality of display areas to the first controllers, so that the first controller uses driving chips corresponding to the plurality of display areas for refreshing and displaying.

As an optional implementation, the processor 601 is further configured to: obtain the fixation point coordinates of the user on the display screen of the display device by a camera device, wherein the camera device is integrated on the display device.

Based on the same invention conception, the embodiment of the present disclosure also provides a device for partition display, and because the device is the device in the method in the embodiments of the present disclosure, and the principle of the device to solve the problem is similar to the method, the implementation of the device can be referred to the implementation of the method, which will not be repeated herein.

Figure 7:
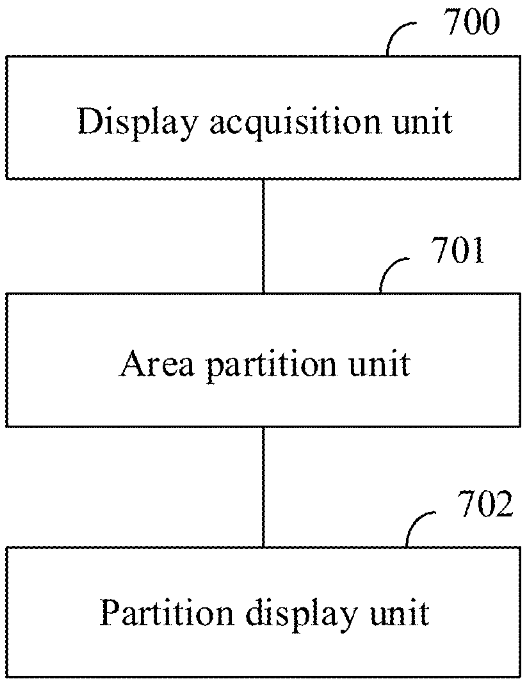
FIG. 7 is a schematic diagram of a device for partition display provided by an embodiment of the present disclosure.

As shown in FIG. 7, the device includes: a display acquisition unit 700 configured to receive and display a current frame image for the display device, and obtain the fixation point coordinates of the user on the display screen of the display device; an area partition unit 701 configured to divide a display region of the display screen into a plurality of display areas according to the fixation point coordinates, and determine first controllers respectively corresponding to the plurality of display areas, wherein each of the first controllers includes at least one driving chip; and a partition display unit 702 configured to a next frame image, and control the next frame image for being displayed in the plurality of display areas by using the first controllers, respectively, wherein the next frame image includes a plurality of sub-images, and one display region is used for displaying one sub-image.

As an optional implementation, the plurality of display areas include a fixation area and a non-fixation area. The area partition unit 701 is further configured to: divide the display region into the fixation area and the non-fixation area according to the fixation point coordinates and a viewing angle range of the user, wherein sub-images displayed in the fixation area are within the viewing angle range, and sub-images displayed in the non-fixation area exceed the viewing angle range.

As an optional implementation, the fixation area includes a boundary area, and the boundary area is determined according to a display cell controlled by the driving chip corresponding to a boundary of the fixation area, wherein the display region includes a plurality of display cells, and each of the plurality of display cells is controlled for display through one driving chip.

As an optional implementation, the partition display unit 702 is further configured to: control, according to a difference degree between sub-images in the next frame image and in the current frame image, the next frame image for being displayed in the plurality of display areas by using the first controllers.

As an optional implementation, the partition display unit 702 is further configured to: in a condition that difference degrees between a part of sub-images in the next frame image and in the current frame image are greater than an image threshold, refresh and display the part of sub-images in the next frame image; or in a condition that difference degrees between all sub-images in the next frame image and in the current frame image are greater than the image threshold, refresh and display all the sub-images in the next frame image.

As an optional implementation, the plurality of display areas include a fixation area and a non-fixation area. The partition display unit 702 is further configured to: in a condition that difference degrees between sub-images in the fixation area in the next frame image and in the current frame image are greater than the image threshold, and difference degrees between sub-images in the non-fixation area in the next frame image and in the current frame image are less than or equal to the image threshold, refresh and display the sub-images in the fixation area in the next frame image by using the first controller corresponding to the fixation area.

As an optional implementation, in a condition that the difference degrees between a part of sub-images in the next frame image and in the current frame image are greater than the image threshold, the partition display unit 702 is further configured to: determine a first display area corresponding to the part of sub-images, and turn on an operational amplifier (OP) of the driving chip in the first controller corresponding to the first display area; and determine a second display area corresponding to sub-images other than the part of the sub-images, and turn off the OP of the driving chip in the first controller corresponding to the second display area.

As an optional implementation, the partition display unit 702 is further configured to: determine second controllers respectively corresponding to the plurality of display areas, wherein each of the second controllers includes at least one group of gate driver on array (GOA) circuits, and each group of GOA circuits is controlled through a separate signal; and scan the plurality of display areas by using the second controllers to refresh and display sub-images corresponding to the plurality of display areas.

As an optional implementation, the plurality of display areas include a fixation area and a non-fixation area. The partition display unit 702 is further configured to: in a condition that difference degrees between sub-images in the fixation area in the next frame image and in the current frame image are greater than an image threshold, and difference degrees between sub-images in the non-fixation area in the next frame image and in the current frame image are less than or equal to the image threshold, scan the fixation area sequentially in rows by using the second controller corresponding to the fixation area; or in a condition that difference degrees between all sub-images in the next frame image and in the current frame image are greater than an image threshold, scan the fixation area sequentially in rows by using the second controller corresponding to the fixation area, and simultaneously scan the non-fixation area in multiple rows by using the second controller corresponding to the non-fixation area.

As an optional implementation, in a condition that difference degrees between sub-images in the fixation area in the next frame image and in the current frame image are greater than the image threshold, and difference degrees between sub-images in the non-fixation area in the next frame image and in the current frame image are less than or equal to the image threshold, the partition display unit 702 is further configured to: load a control signal to each group of GOA circuits in the second controller corresponding to the fixation area, and unload a control signal to each group of GOA circuits in the second controller corresponding to the non-fixation area.

As an optional implementation, the partition display unit 702 is further configured to: in response to a specified operation for an any region in the display region, determine a first sub-image, corresponding to the any region, in the next frame image; control the first sub-image in the next frame image to be refreshed and displayed by using a first controller corresponding to the any region.

As an optional implementation, the device further includes a first transmitting unit which is further configured to: send the fixation point coordinates to a graphics processing unit (GPU) for the GPU to determine the plurality of display areas according to the fixation point coordinates and to compress sub-images corresponding to different display areas in the next frame image according to different compression ratios; and/or, send location information of the plurality of display areas and identification information corresponding to the plurality of display areas to the GPU for the GPU to compress sub-images corresponding to different display areas in the next frame image according to different compression ratios, wherein the identification information is used for representing the driving chip.

As an optional implementation, the plurality of display areas include a fixation area and a non-fixation areas; and sub-images corresponding to the fixation area in the next frame image are uncompressed images, and sub-images corresponding to the non-fixation area in the next frame image are compressed images; or a compression ratio of the sub-images corresponding to the fixation area in the next frame image is lower than a compression ratio of the sub-images corresponding to the non-fixation area in the next frame image.

As an optional implementation, the fixation area includes a boundary area. The sub-images corresponding to the boundary area in the next frame image are images including compressed image data and uncompressed image data.

As an optional implementation, the display screen is configured to display 3D images of different viewing angles, and image contents displayed in the 3D images of different viewing angles are different.

As an optional implementation, the device further includes a second transmitting unit which is further configured to: transmit the fixation point coordinates to the first controllers, so that the first controller determines the plurality of display areas according to the fixation point coordinates and uses driving chips corresponding to the plurality of display areas for refreshing and displaying; and/or, transmit location information of the plurality of display areas and identification information corresponding to the plurality of display areas to the first controllers, so that the first controller uses driving chips corresponding to the plurality of display areas for refreshing and displaying.

As an optional implementation, the display acquisition unit 700 is further configured to: obtain the fixation point coordinates of the user on the display screen of the display device by a camera device, wherein the camera device is integrated on the display device.

Based on the same invention conception, the embodiment of the present disclosure provides a computer storage medium, which includes: computer program codes, when the computer program codes are run on the computer, the computer is caused to execute any method for partition display as discussed above. Since the principle of solving the problem of the above-mentioned computer storage medium is similar to the method for partition display, the implementation of the above-mentioned computer storage medium can be referred to the implementation of the method, and the repetition will not be repeated.

In the specific implementation process, the computer storage medium may include: universal serial bus (USB) flash drive, mobile hard disk, read-only memory (ROM), random access memory (RAM), magnetic disk or optical disc and other storage media that can store program codes.

Based on the same invention conception, the disclosed embodiment also provides a computer program product, which includes: computer program codes, when the computer program codes are run on a computer, causes the computer to perform any method for partition display as described above. Since the principle of solving the problem of the above-mentioned computer program products is similar to the method for partition display, the implementation of the above-mentioned computer program products can be referred to the implementation of the method, and the repetition will not be repeated.

A computer program product may be in any combination of one or more readable media. Readable media can be either readable signal media or readable storage media. Readable storage media may be, for example, but not limited to, electrical, magnetic, optical, electromagnetic, infrared, or semiconductor systems, devices, or devices, or any combination thereof. More specific examples (non-exhaustive list) of readable storage media include: electrical connections with one or more wires, portable disks, hard disks, random access memory (RAM), read-only memory (ROM), erasable programmable read-only memory (EPROM or flash), optical fibers, portable compact disk read-only memory (CD-ROM), optical storage devices, magnetic storage devices, or any suitable combination of the above.

Those skilled in the art should understand that the embodiments of the present disclosure may be provided as a process, system, or computer program product. Therefore, the present disclosure may take the form of a complete hardware embodiment, a complete software embodiment, or a combination of software and hardware embodiments. Moreover, the present disclosure may take the form of a computer program product implemented on one or more computer-available storage media (including, but not limited to, disk memory and optical memory, etc.) containing computer-usable program code.

The present disclosure is described with reference to the flow diagram and/or block diagram of the method, device (system), and the computer program product according to the embodiments of the present disclosure. It should be understood that each process and/or block in the flow diagram and/or block diagram, as well as the combination of the process and/or block in the flow diagram and/or block diagram, can be implemented by computer program instructions. These computer program instructions may be provided to the processor of a general-purpose computer, a specialized computer, an embedded processing machine, or other programmable data processing device to produce a machine such that instructions executed by the processor of the computer or other programmable data processing device produce a device used to implement the functions specified in one or more processes of the flow diagram and/or one or more blocks of the block diagram.

These computer program instructions may also be stored in the computer-readable memory capable of directing a computer or other programmable data-processing device to behave in a particular manner, so that the instructions stored in the computer's readable memory produce a manufactured product that includes a directive device that implements the functions specified in one or more processes of the flow diagram and/or one or more blocks of the block diagram.

These computer program instructions may also be loaded onto a computer or other programmable data processing device such that a series of operational steps are performed on the computer or other programmable device to produce computer-implemented processing, so that the instructions executed on the computer or other programmable device provide steps for implementing the function specified in one or more processes of the flow diagram and/or one or more blocks of the block diagram.

Obviously, those skilled in the art may make various alterations and variations to the present disclosure without departing from the spirit and scope of the present disclosure. Thus, if these modifications and variations of the present disclosure fall within the scope of the claims of the present disclosure and its equivalents, the present disclosure is also intended to include such modifications and variations.

What is claimed is:

1. A method for partition display, comprising:

receiving and displaying, by a display device, a current frame image, and obtaining fixation point coordinates of a user on a display screen of the display device;

dividing a display region of the display screen into a plurality of display areas according to the fixation point coordinates, and determining first controllers respectively corresponding to the plurality of display areas, wherein each of the first controllers comprises at least one driving chip; and receiving a next frame image, and controlling the next frame image for being displayed in the plurality of display areas by using the first controllers, respectively, wherein the next frame image comprises a plurality of sub-images, and one display region is used for displaying one sub-image;

wherein the controlling the next frame image for being displayed in the plurality of display areas by using the first controllers, comprises:

controlling, according to a difference degree between sub-images in the next frame image and in the current frame image, the next frame image for being displayed in the plurality of display areas by using the first controllers;

wherein the controlling, according to a difference degree between each of sub-images in the next frame image and each of sub-images in the current frame image, the next frame image for being displayed in the plurality of display areas by using the first controllers, comprises:

in a condition that difference degrees between a part of sub-images in the next frame image and in the current frame image are greater than an image threshold, refreshing and displaying the part of sub-images in the next frame image; or in a condition that difference degrees between all sub-images in the next frame image and in the current frame image are greater than the image threshold, refreshing and displaying all the sub-images in the next frame image.

2. The method according to claim 1, wherein the plurality of display areas comprise a fixation area and a non-fixation area; and the dividing the display region of the display screen into the plurality of display areas according to the fixation point coordinates, comprises:

dividing the display region into the fixation area and the non-fixation area according to the fixation point coordinates and a viewing angle range of the user, wherein sub-images displayed in the fixation area are within the viewing angle range, and sub-images displayed in the non-fixation area exceed the viewing angle range.

3. The method according to claim 2, wherein the fixation area comprises a boundary area, and the boundary area is determined according to a display cell controlled by the driving chip corresponding to a boundary of the fixation area, wherein the display region comprises a plurality of display cells, and each of the plurality of display cells is controlled for display through one driving chip.

4. The method according to claim 1, wherein the plurality of display areas comprise a fixation area and a non-fixation area;

in a condition that difference degrees between sub-images in the fixation area in the next frame image and in the current frame image are greater than the image threshold, and difference degrees between sub-images in the non-fixation area in the next frame image and in the current frame image are less than or equal to the image threshold, refreshing and displaying the sub-images in the fixation area in the next frame image by using the first controller corresponding to the fixation area.

5. The method according to claim 1, further comprising: in a condition that the difference degrees between a part of sub-images in the next frame image and in the current frame image are greater than the image threshold:

determining a first display area corresponding to the part of sub-images, and turning on an operational amplifier (OP) of the driving chip in the first controller corresponding to the first display area; and determining a second display area corresponding to sub-images other than the part of the sub-images, and turning off the OP of the driving chip in the first controller corresponding to the second display area.

6. The method according to claim 1, further comprising:

determining second controllers respectively corresponding to the plurality of display areas, wherein each of the second controllers comprises at least one group of gate driver on array (GOA) circuits, and each group of GOA circuits is controlled through a separate signal; and scanning the plurality of display areas by using the second controllers to refresh and display sub-images corresponding to the plurality of display areas.

7. The method according to claim 6, wherein the plurality of display areas comprise a fixation area and a non-fixation area; and the scanning the plurality of display areas by using the second controllers comprises:

in a condition that difference degrees between sub-images in the fixation area in the next frame image and in the current frame image are greater than an image threshold, and difference degrees between sub-images in the non-fixation area in the next frame image and in the current frame image are less than or equal to the image threshold, scanning the fixation area sequentially in rows by using the second controller corresponding to the fixation area; or in a condition that difference degrees between all sub-images in the next frame image and in the current frame image are greater than an image threshold, scanning the fixation area sequentially in rows by using the second controller corresponding to the fixation area, and simultaneously scanning the non-fixation area in multiple rows by using the second controller corresponding to the non-fixation area.

8. The method according to claim 6, further comprising: in a condition that difference degrees between sub-images in the fixation area in the next frame image and in the current frame image are greater than an image threshold, and difference degrees between sub-images in a non-fixation area in the next frame image and in the current frame image are less than or equal to the image threshold:

loading a control signal to each group of GOA circuits in the second controller corresponding to the fixation area, and unloading a control signal to each group of GOA circuits in the second controller corresponding to the non-fixation area.

9. The method according to claim 1, further comprising:

in response to a specified operation for an any region in the display region, determining a first sub-image, corresponding to the any region, in the next frame image;

controlling the first sub-image in the next frame image to be refreshed and displayed by using a first controller corresponding to the any region.

10. The method according to claim 1, further comprising:

sending the fixation point coordinates to a graphics processing unit (GPU) for the GPU to determine the plurality of display areas according to the fixation point coordinates and to compress sub-images corresponding to different display areas in the next frame image according to different compression ratios; and/or, sending location information of the plurality of display areas and identification information corresponding to the plurality of display areas to the GPU for the GPU to compress sub-images corresponding to different display areas in the next frame image according to different compression ratios, wherein the identification information is used for representing the driving chip.

11. The method according to claim 10, wherein the plurality of display areas comprise a fixation area and a non-fixation area; and sub-images corresponding to the fixation area in the next frame image are uncompressed images, and sub-images corresponding to the non-fixation area in the next frame image are compressed images; or a compression ratio of the sub-images corresponding to the fixation area in the next frame image is lower than a compression ratio of the sub-images corresponding to the non-fixation area in the next frame image.

12. The method according to claim 11, wherein the fixation area comprises a boundary area; and sub-images corresponding to the boundary area in the next frame image are images comprising compressed image data and uncompressed image data.

13. The method according to claim 1, wherein the display screen is configured to display 3D images of different viewing angles, and image contents of the 3D images of different viewing angles are different.

14. The method according to claim 1, further comprising:

transmitting the fixation point coordinates to the first controllers, so that the first controller determines the plurality of display areas according to the fixation point coordinates and uses driving chips corresponding to the plurality of display areas for refreshing and displaying; and/or, transmitting location information of the plurality of display areas and identification information corresponding to the plurality of display areas to the first controllers, so that the first controller uses driving chips corresponding to the plurality of display areas for refreshing and displaying.

15. The method according to claim 1, wherein the obtaining the fixation point coordinates of the user on the display screen of the display device, comprises:

obtaining the fixation point coordinates of the user on the display screen of the display device by a camera device, wherein the camera device is integrated on the display device.

16. A display device, comprising a display screen and a processor, wherein:

the display screen is configured to display contents; and the processor is configured to execute steps in the method according to claim 1.

17. The method according to claim 2, further comprising:

in response to a specified operation for an any region in the display region, determining a first sub-image, corresponding to the any region, in the next frame image;

controlling the first sub-image in the next frame image to be refreshed and displayed by using a first controller corresponding to the any region.

* * * * *